United States Patent [19]
Banker et al.

[11] Patent Number: 5,317,391
[45] Date of Patent: May 31, 1994

[54] METHOD AND APPARATUS FOR PROVIDING MESSAGE INFORMATION TO SUBSCRIBERS IN A CABLE TELEVISION SYSTEM

[75] Inventors: Robert O. Banker, Cumming; Kinney C. Bacon, Lawrenceville; Julius B. Bagley, Marietta, all of Ga.

[73] Assignee: Scientific-Atlanta, Inc., Norcross, Ga.

[21] Appl. No.: 799,987

[22] Filed: Nov. 29, 1991

[51] Int. Cl.⁵ .................... H04N 7/08; H04H 1/02
[52] U.S. Cl. ........................... 348/6; 455/3.1; 455/6.1
[58] Field of Search ............ 358/86, 84, 140; 380/20, 13, 6.2; 455/6.2, 26.1, 2, 3.1, 4.2, 6.1, 6.3

[56] References Cited

U.S. PATENT DOCUMENTS

| | | |
|---|---|---|
| 4,633,297 | 12/1986 | Skerlos et al. . |
| 4,706,121 | 11/1987 | Young . |
| 4,829,569 | 5/1989 | Seth-Smith et al. . |
| 4,885,775 | 12/1989 | Lucas . |
| 4,894,789 | 1/1990 | Yee .................... 358/86 |
| 4,924,498 | 5/1990 | Farmer et al. . |
| 4,928,168 | 5/1990 | Iwashita . |
| 4,963,994 | 10/1990 | Levine . |
| 4,991,011 | 2/1991 | Johnson et al. . |
| 5,001,554 | 3/1991 | Johnson et al. ........... 358/86 |
| 5,054,071 | 10/1991 | Bacon . |
| 5,058,160 | 10/1991 | Banker et al. . |
| 5,077,607 | 12/1991 | Johnson et al. . |
| 5,091,937 | 2/1992 | Kawasaki ................ 358/86 |

FOREIGN PATENT DOCUMENTS

| | | |
|---|---|---|
| 0103438A1 | 3/1984 | European Pat. Off. . |
| 0178866 | 4/1986 | European Pat. Off. . |
| 0093739 | 5/1986 | Japan .................... 358/86 |
| WO9007847 | 7/1990 | PCT Int'l Appl. . |
| WO9013100 | 11/1990 | PCT Int'l Appl. . |
| WO9013207 | 11/1990 | PCT Int'l Appl. . |
| 2232031A | 11/1990 | United Kingdom . |
| 8601962 | 3/1986 | World Int. Prop. O. ...... 358/86 |

Primary Examiner—Reinhard J. Eisenzopf
Assistant Examiner—Nguyen Vo
Attorney, Agent, or Firm—Banner, Birch, McKie & Beckett

[57] ABSTRACT

A subscriber terminal apparatus for a television in an in-band subscription television system is provided. The subscriber terminal includes a receiver for receiving a television signal including video, audio, ana data information. A selector selects a channel of the television signal. A memory stores a plurality of barker screens providing messages regarding one or more channels of the television signal. An on-screen display control circuit controls the display of the barker screens on the television. A processor retrieving a barker screen from the memory supplies the retrieved screen to the on-screen display control circuit if the barker screen provides a message regarding a selected channel. Barker screen information may also be obtained from a dedicated data channel or a six megahertz video barker channel.

20 Claims, 10 Drawing Sheets

FIG. 5A(1)
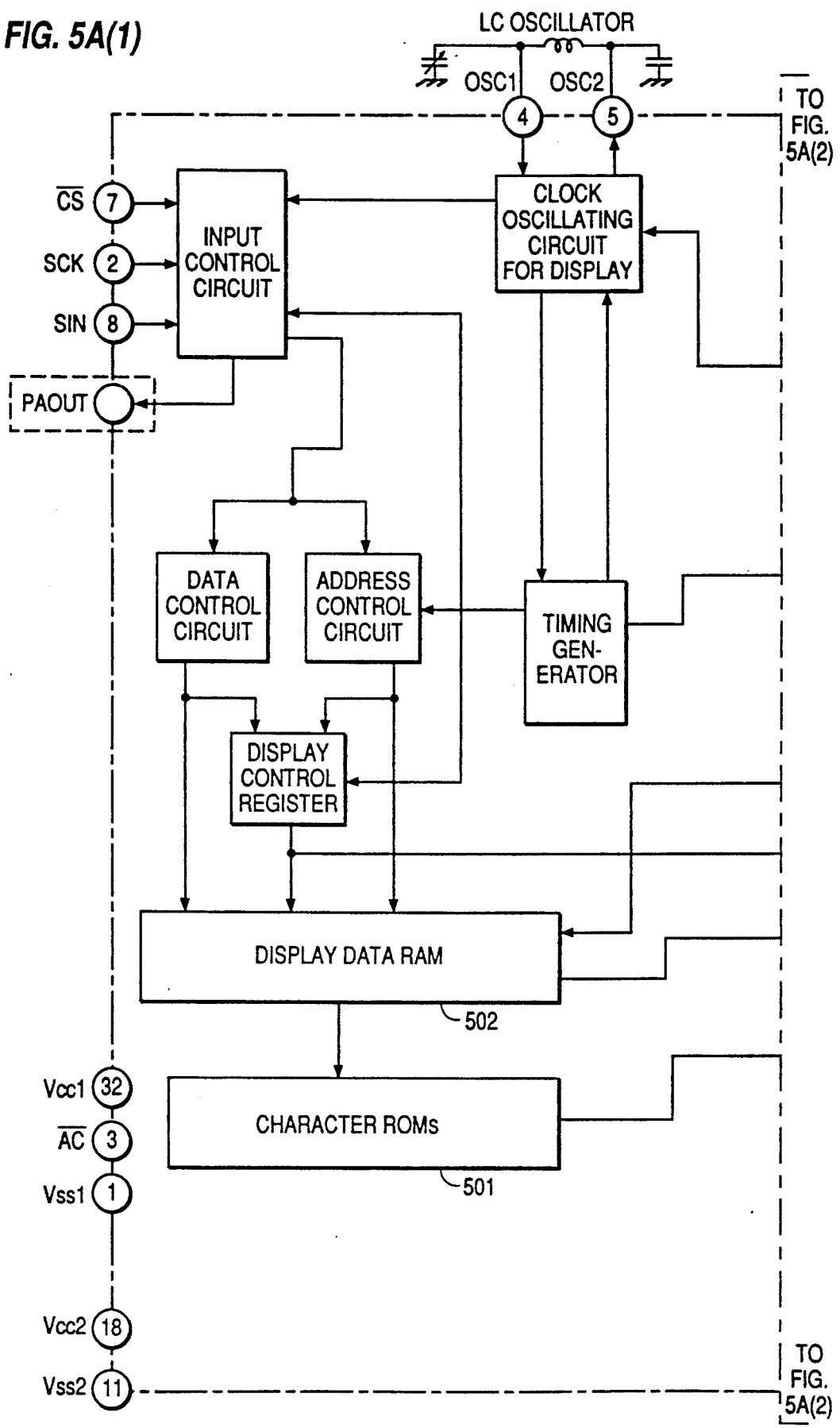

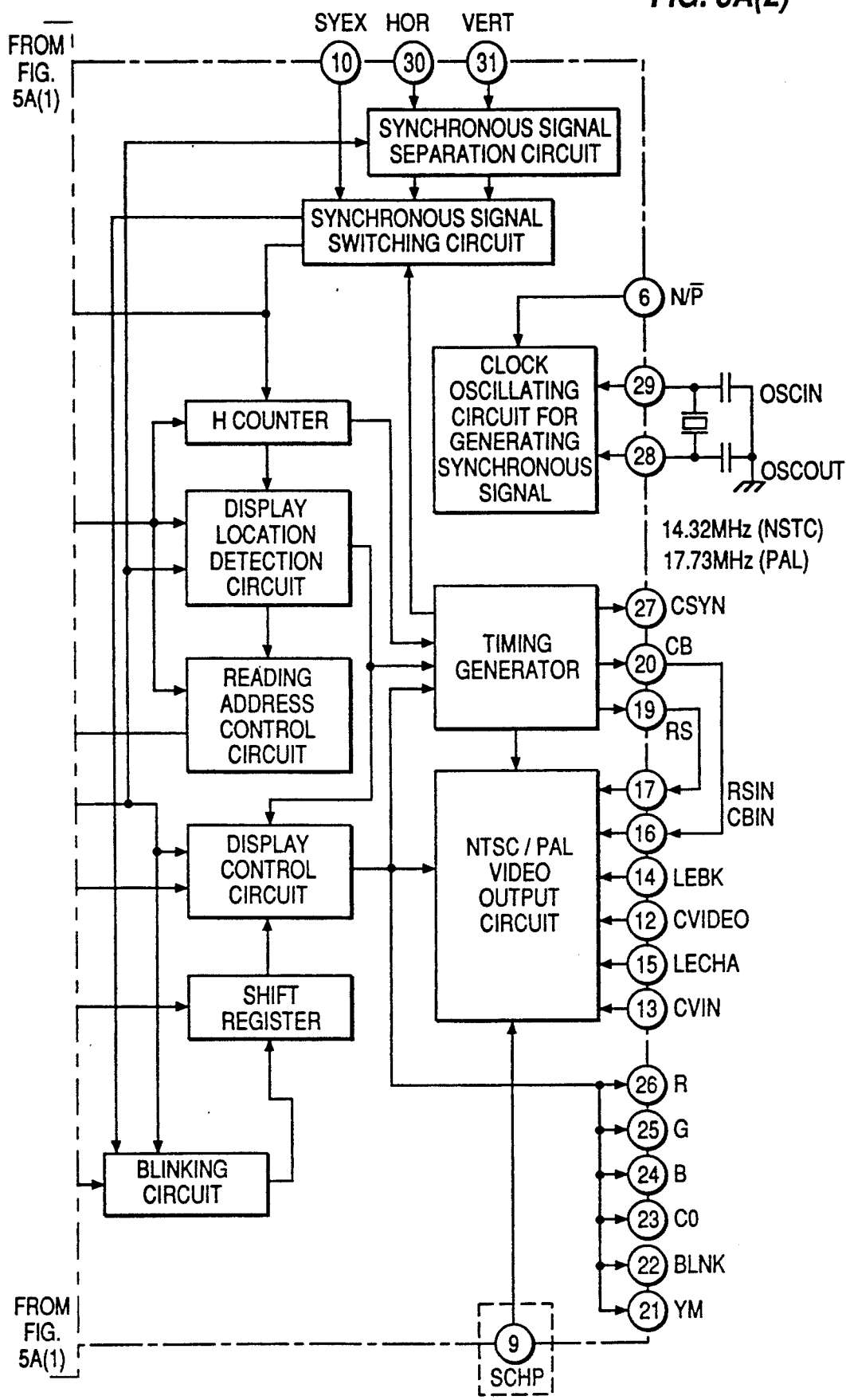
FIG. 5A(2)

| CHARACTER COLOR BITS | BLINKING BIT | CHARACTER CODE |
|---|---|---|

FIG. 5B

| DISPLAY NUMBER | SCREEN NUMBER | LAST SCREEN FLAG | SEQUENCE NUMBER | CHARACTERS |
|---|---|---|---|---|

FIG. 6A

| ID | ON SCREEN ALERT DATA | DISPLAY NUMBER | BACKGROUND COLOR | TUNING DATA | MESSAGE EXPIRATION | ADDRESS DATA |
|---|---|---|---|---|---|---|

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|----|----|----|----|----|----|----|----|----|----|----|----|----|----|----|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |
| 121 | 122 | 123 | 124 | 125 | 126 | 127 | 128 | 129 | 130 | 131 | 132 | 133 | 134 | 135 | 136 | 137 | 138 | 139 | 140 | 141 | 142 | 143 | 144 |
| 145 | 146 | 147 | 148 | 149 | 150 | 151 | 152 | 153 | 154 | 155 | 156 | 157 | 158 | 159 | 160 | 161 | 162 | 163 | 164 | 165 | 166 | 167 | 168 |
| 169 | 170 | 171 | 172 | 173 | 174 | 175 | 176 | 177 | 178 | 179 | 180 | 181 | 182 | 183 | 184 | 185 | 186 | 187 | 188 | 189 | 190 | 191 | 192 |
| 193 | 194 | 195 | 196 | 197 | 198 | 199 | 200 | 201 | 202 | 203 | 204 | 205 | 206 | 207 | 208 | 209 | 210 | 211 | 212 | 213 | 214 | 215 | 216 |
| 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 |

FIG. 9A

OFF     BARKER

FIG. 9D

TIMEOUT    BARKER

BE SURE THE INPUT CABLE
IS CONNECTED TO THIS
SET-TOP TERMINAL

FIG. 9B

INVALID CHANNEL    BARKER

CHANNEL 78 IS
NOT AVAILABLE

FIG. 9E

TURNED-ON    BARKER

PRESS [CH▲] OR [CH▼] TO
CONTINUE.

FIG. 9C

NOT AUTHORIZED    BARKER

YOU HAVE NOT ORDERED
CHANNEL 42 HBO

FIG. 9F

PARENTAL CONTROL  BARKER

CHANNEL 59 HAPY IS
PARENTALLY CONTROLLED.

FIG. 9G

TAMPER    BARKER

FIG. 9H

PPV NO PREVIEW    BARKER

PAY-PER-VIEW EVENTS
ARE SHOWN ON
CHANNEL 98 PPV1

FIG. 9I

IPPV FULL    BARKER

YOU CANNOT PURCHASE ANY
MORE PAY-PER-VIEW EVENTS
AT THIS TIME.

FIG. 9J

IPPV HELP    BARKER

YOU CAN NOW BUY
THE PAY-PER-VIEW EVENT
ON CHANNEL 42 HTCH

PRESS [BUY] TO BEGIN

METHOD AND APPARATUS FOR PROVIDING MESSAGE INFORMATION TO SUBSCRIBERS IN A CABLE TELEVISION SYSTEM

TECHNICAL FIELD

The present invention generally relates to a method and apparatus for providing information to subscribers in a cable television system and, more particularly, to a method and apparatus for generating and forwarding messages including characters for display on a television receiver in a cable television system. The messages may, for example, include barker information.

BACKGROUND OF THE INVENTION

One important feature of a cable television system is the capability of a system operator to effectively provide information to subscribers. Video barker channels are one example of such information. For example, when a subscriber selects a channel which he or she is not able to view, a six megahertz video barker channel may be tuned which provides a message such as shown in FIG. 1 on the subscriber's television to indicate that the selected channel is not available for viewing. A subscriber may not be able to view a selected channel for a number of reasons. For example, the selected channel may have a pay-per-view event which the subscriber has not purchased. Alternatively, the channel may be a premium channel for which the subscriber is not authorized. The channel may also be under parental control or may simply not be available in the cable system. Each of these reasons may prevent a subscriber from viewing a selected channel.

In prior art systems, the same video barker channel is typically tuned for each of the above situations. Accordingly, a generic message such as that shown in FIG. 1 is provided. Thus, although a subscriber is provided an indication that he or she cannot view a selected channel, no specific reason is provided. Of course, an operator could provide separate barker channels for each of these situations and others. However, the use of separate six megahertz video barker channels to provide such information reduces the number of channels available for other programming.

SUMMARY OF THE INVENTION

Accordingly, it is an object of the present invention to provide a method and apparatus for providing message information to subscribers.

It is a further object of the present invention to provide message information to a subscriber utilizing a minimum bandwidth.

In accordance with the present invention, a subscriber terminal apparatus for a television in an in-band subscription television system includes a receiver for receiving a television signal including video, audio, and data information. A selector selects a channel of the television signal. A memory stores a plurality of barker screens providing messages regarding one or more channels of the television signal. An on-screen display control circuit controls the display of the barker screens on the television. A processor retrieving a barker screen from the memory supplies the retrieved screen to the on-screen display control circuit if the barker screen provides a message regarding a selected channel.

This arrangement permits specific information to be provided to a subscriber tuning a channel which he or she is not able to view for a particular reason. This capability is provided without the need for using a six megahertz video barker channel and thus the channel capacity of a system operator is enhanced.

BRIEF DESCRIPTION OF THE DRAWINGS

A more complete appreciation of the invention and many of the attendant advantages thereof will be readily obtained as the invention becomes better understood by reference to the following detailed description when considered in connection with the accompanying drawings.

FIGS. 5A(1) and 5A(2) illustrate a block diagram of the on-screen display control of FIG. 4.

FIG. 5B illustrates memory locations of RAM of the on-screen display of FIG. 5A.

FIG. 5C illustrates the configuration of the on-screen display.

FIG. 6A illustrates a message transaction in accordance with the present invention.

FIG. 6B illustrates a message definition transaction in accordance with the present invention.

FIG. 7 illustrates an on-screen message alert in accordance with the present invention.

FIG. 8 illustrates a barker transaction in accordance with the present invention.

FIGS. 9A-9J illustrate ROM barkers in accordance with the present invention.

DETAILED DESCRIPTION OF THE PREFERRED EMBODIMENT

Figure 1:
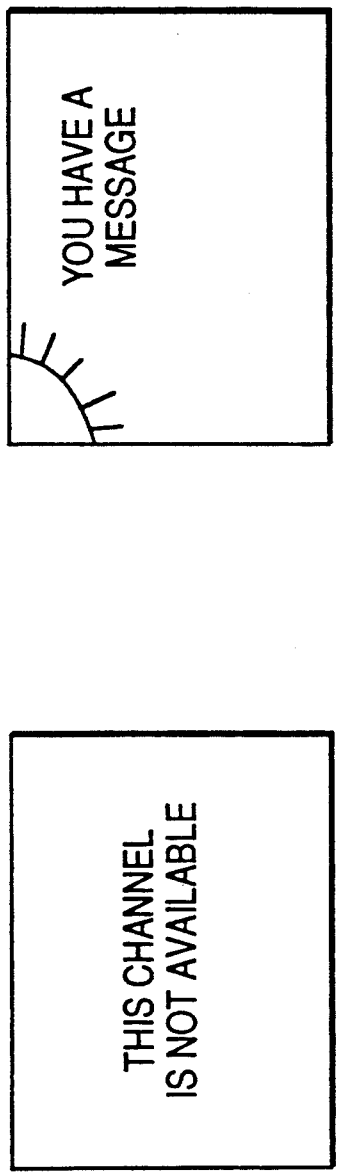
FIG. 1 depicts a prior art barker provided to inform a subscriber that a channel is unavailable.
Figure 2:
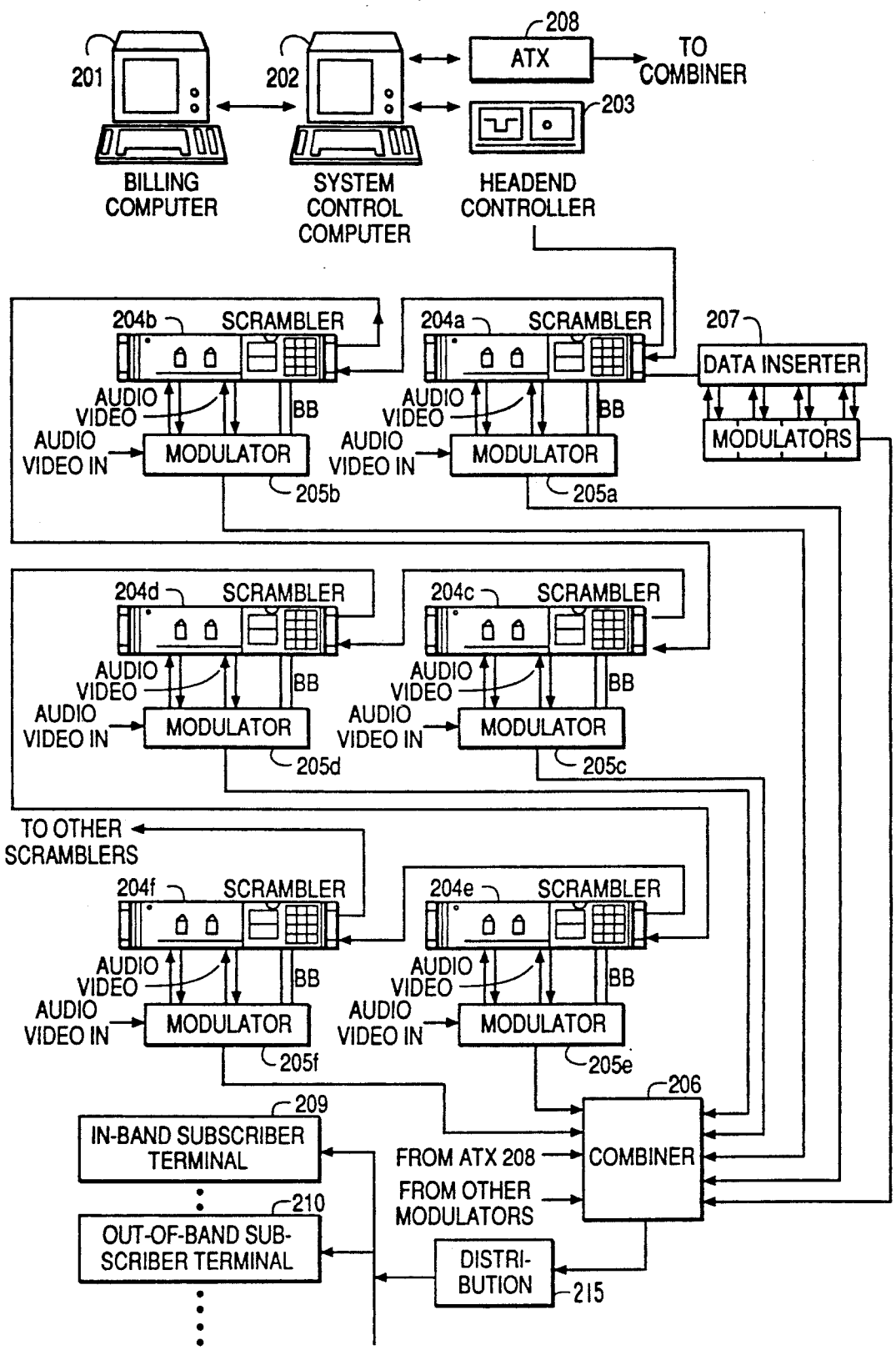
FIG. 2 is a block diagram of a headend for an in-band cable television system in accordance with the present invention.

FIG. 2 is a block diagram of a subscription television system in which the present invention may be implemented. Billing computer 201 includes a subscriber database and generates a monthly bill for the subscribers in the system based on level of service and any pay-per-view and impulse pay-per-view purchases. System control computer 202 such as an HP-1000 is interfaced to billing computer 201. System control computer 202 receives transactions such as authorization transactions from billing computer 201 and formats and forwards transactions to headend controller 203 and addressable transmitter (ATX) 208. System control computer 202 also generates system set-up parameters such as scrambled channels. System control computer 202 configures tuning frequencies of the channels provided to the subscribers and controls on-screen display as described in greater detail below. A system control computer interface is responsible for gathering and appropriately routing the data leaving the system control computer 202. Out-of-band data is sent to addressable transmitter 208 and in-band data is sent to headend controller 203.

Addressable transmitter 208 transmits data to out-of-band subscriber terminals via a dedicated FM data channel such as a 108.2 megahertz data channel in the cable television distribution system. This channel, known as the data carrier, is used to transmit both addressable commands intended for a particular out-of-band subscriber terminal and global commands intended for all out-of-band subscriber terminals in the system. Out-of-band subscriber terminals contain a receiver that is listening to the commands sent over this data channel. Unlike the in-band transactions described in detail below, out-of-band subscriber terminals receive data over this channel no matter what channel the subscriber terminal is tuned to.

Headend controller 203 is coupled to system control computer 202 and formats system control computer transactions for scramblers 204a-204f. Headend controller 203 stores all transactions and has the ability to perform continuous refreshes. The requirement to constantly, repetitively and efficiently transmit the information base arises since there is no permanently tuned data channel for in-band data transactions. Thus, all information flow to the in-band subscriber terminals is subject to the indeterminate availability of a data path to the in-band subscriber terminals. However, to further complicate matters, some of the information is real time critical, i.e. it may pertain to events currently in progress or it may be critical to maintenance or service changes. Other information, although less time critical in nature, may be of considerable value. Some information is pertinent only to certain of the data streams while other information causes a write to nonvolatile memory in the in-band subscriber terminals and must be sent at minimal intervals.

Different groups of data are transmitted on a serial data channel from headend controller 203 to the scramblers. These data groups or data streams are: (1) OFF channel data, (2) barker channel data, (3) pay-per-view (PPV) channel data, (4) premium channel data, (5) scroll channel data, and (6) message channel data. Reference should be made to U.S. Pat. No. 5,058,160, incorporated herein, for details of data streams (1)–(4). Data streams (5) and (6) relate to the communication of message information from a system operator to subscribers and are discussed in greater detail in commonly assigned application Ser. No. 07/800,241 entitled "Method and Apparatus for Tuning Data Channels in a Subscription Television System Having In-Band Data Transmission filed Nov. 29, 1991 and incorporated herein by reference. Each data stream has a unique group address that is received only by scramblers having a matching address. For instance, premium channel data may have a group address of 01, and therefore all scramblers on premium channels should have a group address of 01. Headend controller 203 determines which data is output in each data stream. In an alternative embodiment, scroll channel data and message channel data may be provided to scramblers 204e and 204f on a separate channel in order to maintain a high data rate for the information in data streams (1)–(4).

Scramblers 204a-204f are coupled to headend controller 203 and may be used to selectively scramble television signals for improved security in a subscription television system that is equipped with appropriate descramblers. The video, for example, may be scrambled in any manner known in the art including sync suppression and video inversion. For illustrative purposes only, it is assumed that scramblers 204a-204f respectively correspond only to data streams (1)–(6) identified above. The outputs of scramblers 204a-204f are respectively supplied to modulators 205a-205f. The outputs of modulators 205a-205f are supplied to combiner 206 which outputs a television signal for distribution over distribution system 215 to both in-band subscriber terminals 209 and out-of-band subscriber terminals 210. Data from scramblers, e.g., 204a, can also be provided to data inserter 207 for the transmission of in-band data on non-scrambled channels.

Figure 3:
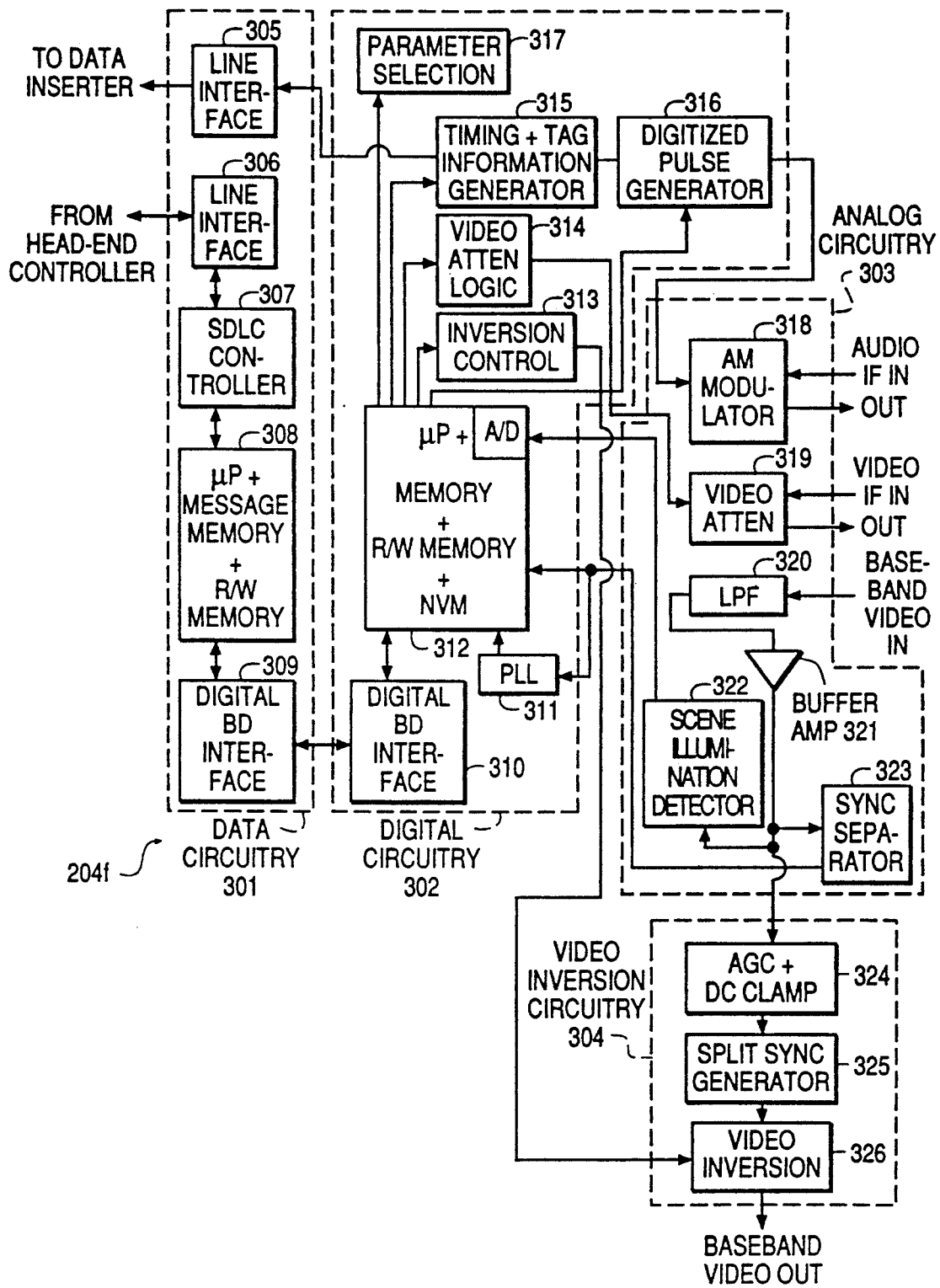
FIG. 3 is a block diagram of scrambler 204f shown in FIG. 2.

FIG. 3 is a block diagram of scrambler 204f shown in FIG. 2. Scrambler 204f receives message channel data from headend controller 203. The message channel data includes character information for display screens which may be addressed to one or more subscriber terminals for display on an associated television. Scrambler 204f includes data circuitry 301, digital circuitry 302, analog circuitry 303, and video inversion circuitry 304. Data circuitry 301 includes line interfaces 305 and 306, synchronous data link control (SDLC) 307, microprocessor 308, and digital circuit interface 309. SDLC 307 controls communication via line interface 306 between scrambler 204f and headend controller 203. Microprocessor 308 receives and processes information from SDLC 307. Information such as message information is stored in non-volatile message memory of microprocessor 308. To ensure sufficient memory for message data, there is preferably at least 128K of non-volatile message memory. Read/write memory of microprocessor 308 stores temporary information. Interface circuit 309 interfaces the data circuitry 301 to the digital circuitry 302.

Digital circuitry 302 includes interface circuit 310, phase locked loop 311, microprocessor 312, inversion control circuit 313, video attenuation logic 314, timing and tag information generator 315, digitized pulse generator 316, and parameter selection circuit 317. Interface circuit 310 interfaces digital circuitry 302 with data circuitry 301. Microprocessor 312 controls all essential functions and features of scrambler 204f. Microprocessor 312 extracts and processes message data from the data circuitry 301 and controls the scrambling modes of the system. Digitized pulse generator 316 generates the specific pulses placed on the sound carrier via the analog circuitry under the control of microprocessor 312. These pulses represent authorization and control information, descrambling information including timing pulses, and message information. Microprocessor 312 is also coupled to parameter selection circuitry 317 which may be a front panel display and keyboard which permits an operator to select various modes of operation, e.g., scrambling.

Analog circuitry 303 includes AM modulator 318, video attenuation circuitry 319, low pass filter 320, buffer amplifier 321, scene illumination detector 322, and synchronization separator 323. AM modulator 318 modulates the pulses from pulse generator 316 onto an audio IF signal from modulator 205 1 and outputs the modulated signal to modulator, 205f. Video attenuation circuitry 319 selectively provides sync suppression type scrambling and attenuates a video IF signal from modulator 205f under the control of video attenuation logic 314.

Baseband video input is filtered with low pass filter 320 which may be a sharp cut-off phase equalized low pass filter. Low pass filter 320 removes high frequency noise that can interfere with the baseband video. After filtering, the video is amplified back to its original level by video amplifier 321. Sync separator 323 extracts synchronization information which is then sent to microprocessor 312 to provide timing information such as composite and vertical sync and odd/even field indication. Scene illumination detector 322 determines the average luminance level of a scene, which level is supplied to an A/D converter of microprocessor 312. Microprocessor 312 uses this luminance information to detect scene changes in order to determine when scrambling modes may optimally be changed. The composite synchronization signal is supplied to the input of phase locked loop (PLL) 311. Phase locked loop 311 locks the system clock to the line rate.

The baseband video signal from amplifier 321 is also supplied to video inversion circuitry 304. Video inversion circuitry 304 includes automatic gain control (AGC) and DC clamping circuitry 324, split sync generator 325, and video inversion circuit 326. The AGC of circuit 324 adjusts the incoming signal to a predetermined value such as 1 V peak to peak. The DC clamping of circuitry 324 forces the bottom of the sync tip to be at ground. The output of circuitry 324 is supplied to a split synchronization circuit 325. The details of split synchronization circuitry is discussed in detail in commonly assigned U.S. Pat. No. 4,924,498, incorporated herein by reference. The output of split synchronization circuitry 325 is provided to inverting circuitry 326 for inverting the baseband video about an inversion axis. Inversion is controlled in accordance with signals from inversion control circuit 313.

Scrambler 204e receives scroll channel data from headend controller 203. The scroll channel data includes character information which defines barker screens which have been designed by the system operator on system control computer 202. Scrambler 204e is configured in the same manner as scrambler 204f but need not include a 128K memory. Rather, 32K of nonvolatile memory may be utilized. Scramblers 204e and 204f respectively store the scroll channel data and message channel data and continuously output the data on the corresponding scroll and message channels. Since the scroll channel data and the message channel data preferably define a plurality of barker and message screens, the stored data is output in a loop. Thus, if there are 8 barker screens, the information for the first screen is followed by the information for the second screen and so on. When the information for the eighth screen is sent, it is followed by the information for the first screen. A similar loop is established for the message channel data. Details of scramblers 204a-204d may be found in the above-identified U.S. Pat. No. 5,058,160.

Figure 4:
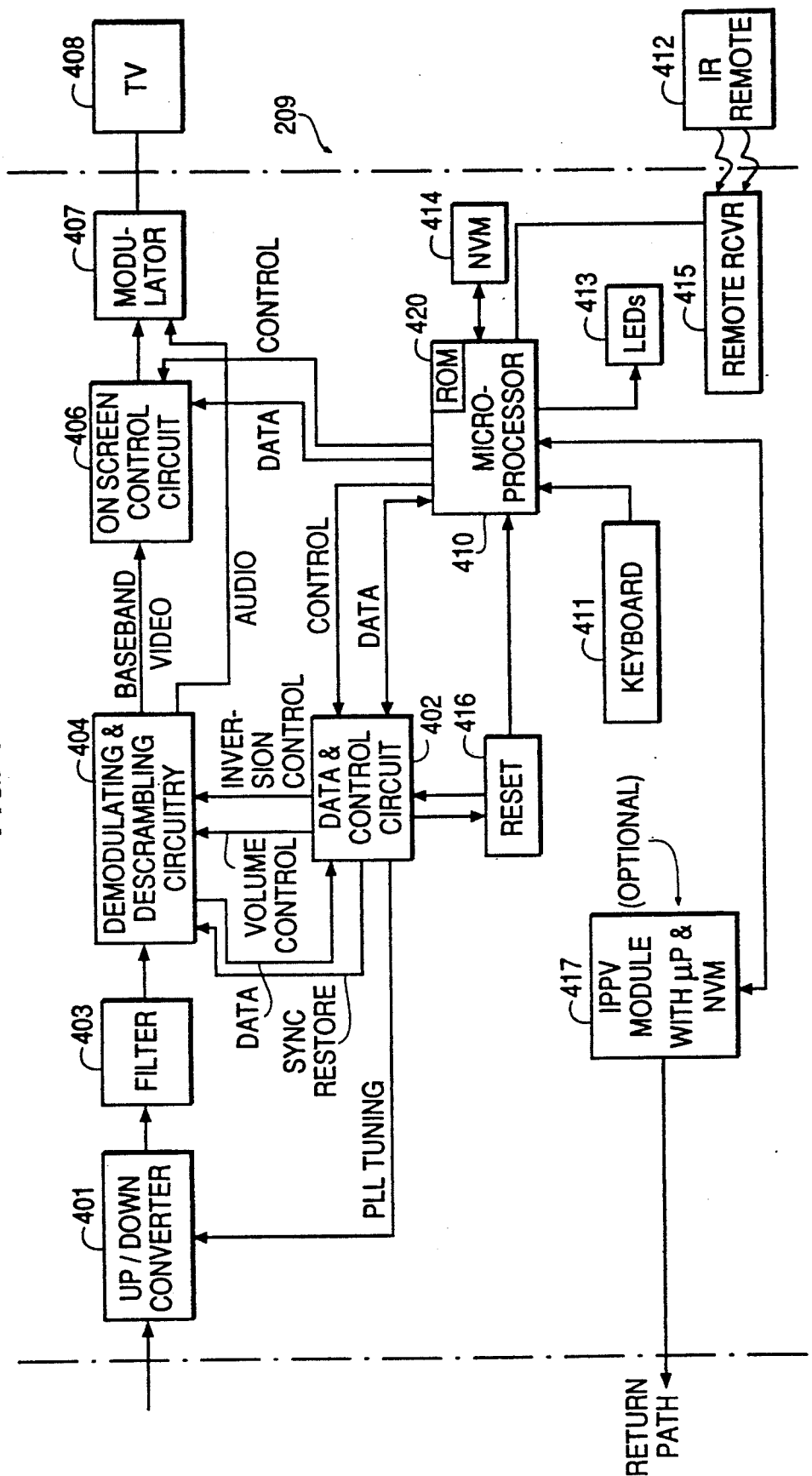
FIG. 4 is a block diagram of a baseband subscriber terminal in accordance with the present invention.

FIG. 4 is a block diagram illustrating the components of a subscriber terminal 209 in accordance with the present invention. Although the subscriber terminal is described below as a baseband subscriber terminal, it will be apparent that other subscriber terminals such as RF subscriber terminals may be utilized. The signal from distribution system 215 is supplied to up/down converter 401. Up/down converter 401 uses a phase locked loop under the control of data and control circuit 402 to convert a selected RF input signal to a 4.5 megahertz signal. Filter 403 such as a SAW filter filters the signal. Demodulating and descrambling circuitry 404 demodulates and descrambles the filtered signal under the control of data and control circuit 402. Demodulating and descrambling circuitry 404 also performs pulse detection to recover the data modulated onto the audio carrier. The data is supplied to data and control circuit 402. Volume control of the audio is performed by demodulating and descrambling circuitry 404 under the control of data and control circuit 402 and microprocessor 410 as described in U.S. Pat. No. 5,054,071, incorporated herein by reference.

The output of demodulating and descrambling circuitry 404 is an unscrambled baseband video signal which is supplied to on-screen display control circuit 406. On-screen display control circuit 406 is preferably a Mitsubishi M50556 on-screen display controller. On-screen display control circuit 406 selectively generates on-screen character displays in place of or overlaid on the video signal. Modulator 407 converts the signal containing the video, audio, and/or characters from display control 406 on channel 3 or 4 which is supplied to television 408.

Microprocessor 410 controls the overall operation of subscriber terminal 400. Keyboard 411 on a front panel of subscriber terminal 209 generates subscriber supplied signals for channel tuning, volume level, and the like which are supplied to microprocessor 410. Remote receiver 415 receives commands from IR remote 412, as is well known in the art, and provides the commands to microprocessor 410. Reset circuitry 416 resets microprocessor 410 and/or data and control circuit 402 to ensure proper operation of the system if there have been power failures, power surges, and the like. When keyboard 411 or IR remote 412 is utilized to select a channel, microprocessor 410 instructs data and control circuit 402 to appropriately control up/down converter 401 to tune the selected channel. Data and control circuit 402 utilizes recovered descrambling data to generate appropriate control signals, e.g. inversion control and sync restore signals for descrambling the input television signal. Microprocessor 410 determines whether data and control circuit 402 carries out descrambling on the basis of authorizations downloaded from system control computer. LED display 413 displays channel numbers and diagnostics. NVM 414 stores data, e.g., authorizations, and terminal configurations. Subscriber terminal 400 may optionally include IPPV module 417. Module 417 allows the subscriber to authorize his or her subscriber terminal to receive a pay-per-view event, store the data associated with the purchase of that event in non-volatile memory, and transmit the data to the system operator via a telephone, return path or an RF return path. The subscriber is then billed for the purchased events.

FIGS. 5A(1) and 5A(2) illustrate is a block diagram of the Mitsubishi M50456 on-screen display control circuit. The on-screen display control includes character ROM 501 for storing a character set. In a preferred embodiment, the following sixty-four characters are stored in character ROM 501:

---
blank
capital letters A-Z
cursor -- icon
numbers 0-9
blank volume level
four volume level bars
(Pound Sterling)
[ ]    ?-:S',.*#&    +
single character Am Pm Ch
---

Display RAM 502 is set with data from microprocessor 410 via serial input SIN to generate on screen displays using these sixty-four characters. This data may be provided from a number of sources. A first source is message data from message channel data scrambler 204f. A second source is scroll channel data from scroll channel data scrambler 204e. A third source is barker data from ROM 420 of subscriber terminal microprocessor 410. Another source of display information is menu screen information stored in microprocessor ROM 420. The use of such memory screens is described in greater detail in commonly assigned application Ser. No. 07/800,836 entitled "Method and Apparatus for Providing an On-Screen User Interface for a Subscription Television Terminal" filed Nov. 29, 1991 and incorporated herein by reference. Reference may also be made to Scientific Atlanta Publication No. 69P2837 entitled: "Model 8600 Set Top Terminal User's Guide" available from Scientific Atlanta and incorporated herein. Display RAM 502 includes 240 memory locations for characters to be displayed on television 408. As shown in FIG. 5B, each memory location includes a blinking bit which determines whether the character is blinking, character color bits which determine the color of the character, and a character code identifying one of the characters stored in ROM 501. The configuration of the on-screen display is shown in FIG. 5C and can be seen to consist of ten rows of twenty-four characters each. The information in display RAM 502 determines what appears at each of the screen positions 1–240.

There are three modes of on-screen display. The first mode simply provides the video of a selected channel. The second mode is a video overlay mode in which character information is overlaid on the video of a selected channel. The second mode may used for example to display time, channel number, and channel identification information when a subscriber tunes to different channels. Channel identification information is described in a commonly assigned copending application Ser. No. 07/800,002 entitled "Method and Apparatus for Displaying Channel Identification Information" filed Nov. 29, 1991 and incorporated herein by reference. The third mode is a character mode in which character information is presented on a plain background. This mode is preferably used for messages, for example.

It will be apparent that a system operator may utilize either mode to display information to subscribers and the present invention is not limited with respect to whether information is presented on a solid background or overlaid onto a video signal.

Addressable message transaction transmissions for on-screen display may be forwarded to subscriber terminals in the cable system using message scrambler 204$f$. FIG. 6A illustrates a message transaction transmission for forwarding characters to subscriber terminals. Each message transaction transmission has a display number field associated therewith for identifying a message. In accordance with a present embodiment, the display numbers may range from 0 to 65535, although the invention is not limited in this respect. Additionally, a subset of the display numbers, for example from 0 to 7, are reserved for barker text downloaded by scroll channel scrambler 204$e$ as discussed in greater detail below. Each message may include up to sixteen screens, each screen having 240 characters. The characters for each screen are sent in up to eleven sequenced transactions such as illustrated in FIG. 6A. A sequence number field identifies the transaction transmissions in the sequence of transaction transmissions. The transaction transmissions also include a screen number field for identifying the screens in a sequence of screens and a last screen flag for identifying the last screen in a sequence of screens. If the message is less than 240 characters and message scrambler 204$f$ is configured to transmit variable length messages, fewer transaction transmissions need to be sent to complete the message. The message transaction transmission shown in FIG. 6A may then also include a last transaction flag. As discussed in U.S. Pat. No. 5,058,160, the rate at which transactions are sent is 29 transactions per second. At this transaction rate, slightly more than three seconds is required to send eight 240 character messages over the same message channel. Accordingly, the average wait to start receiving one of these messages is approximately 1.5 seconds.

The message channel utilizes a scrambler configured as scrambler 204$f$ with internal data RAM which stores the message loop from headend controller 103 and retransmits it constantly to the subscriber terminals under the control of microprocessor 312. The serial nature of the system is such that as the number of messages in the message loop increases, the response time for a subscriber to receive a message increases. Additional message channels may be utilized to speed up the response time.

The message transaction also permits a system operator to instruct on-screen display control circuit 406 to blank the display on television 408 until the entire screen is received and ready for display. Alternatively, on-screen display control circuit 406 may display the characters as they are received until the message is completed.

A message definition transaction transmission is depicted in FIG. 6B. An ID field identifies the transaction transmission as a message definition. This transaction transmission indicates that a message has been sent to the subscriber terminal. The messages may be individually addressed or addressed to members of a group of subscriber terminals defined by the address data. Using a downloaded transaction, a subscriber terminal can be assigned to one or more groups. In a preferred embodiment, 64 groups are defined, but the invention is not limited in this respect. The message definition transaction defines a background color field for setting the background color of the on-screen display and a tuning field which instructs the terminal which channel to tune to receive the message which, in this example, is the message channel. When a subscriber terminal receives a message definition transaction transmission which is addressed to it or to any group of which it is a member, a message alert in accordance with the alert data field may be provided. The subscriber may view the message by use of a menu structure described in commonly assigned application Ser. No. 07/880,836 entitled "Method and Apparatus for Providing an On-Screen User Interface for a Subscription Television Terminal" incorporated herein by reference. In order to receive the message, data and control circuit 402 of the subscriber terminal tunes up/down converter 401 to the channel defined by the tuning field and searches for a message transaction transmission with the same display number as in the message definition transaction transmission. In a preferred embodiment, the tuning data instructs the subscriber terminal to tune either the channel currently tuned, one of the message channels, the scroll channel, or the OFF channel to retrieve the appropriate message. The message definition transaction transmission of FIG. 6B is preferably sent on all data streams output by headend controller 203 in order to quickly inform a subscriber that he or she has a message.

Although multiple messages may be sent to a subscriber terminal, each subscriber terminal only maintains one pending message definition transaction. This is the message obtained by using the menu structure referenced above. As long as messages are not read, the pending message definition is updated as new message definition transactions are received. The priority of this update is in accordance with the display number in the message definition transaction, such that for two unread messages, the lower display number is read first. A message that has not been read always has priority over a message which has been read.

When a subscriber terminal receives a message definition transaction defining a message for that subscriber terminal, a message alert may be provided. For example, microprocessor 410 may control a segment of LED display 413 to blink on and off. The LED alert ends when the last screen of the message is received and there are no more active unread messages for the subscriber terminal. The message definition may include data which instructs microprocessor 410 to generate an on-screen message alert. If such data is included in the message definition transaction, an on-screen message alert such as that in FIG. 7 will overlay the video until a key on keyboard 411 of the subscriber terminal or remote control 412 is pressed. Preferably, the character codes and layout of the on-screen message alert are stored in ROM 420 of microprocessor 410. The message definition transaction instructs microprocessor 410 to supply the appropriate character codes and layout information to on-screen display control 406. No alert will be given and no messages received if the subscriber terminal is not tuned to a channel with data.

When the message is displayed, it remains on the screen until the user changes the screen. If there are multiple screens, the subscriber may cycle through all message screens and back to the beginning as many times as desired. At each new screen, there will be a waiting time until the appropriate screen is retrieved. When the last screen of a message has been received, the message is defined as being read. After all active messages have been read, the messages can be reread.

Messages are transmitted for a period of time configured by the headend so that message channel data is minimized. An active message control transaction from the headend which flags all groups with active messages is sent periodically. This controls message expiration.

As noted above, a subset of the message transactions may be used for barkers, i.e., message transaction transmissions having display numbers of 0–7 associated therewith. It will be apparent that more or fewer barkers may be used. It is desirable that a system operator provide specific information to a subscriber concerning, for example, his inability to view a particular channel. Such specific information promotes a user friendly interface with the subscriber. A number of conditions exist for which such barkers are useful. Barkers may be tuned if a subscriber terminal is 1. is OFF
2. is tuned to a non-existent channel
3. is not authorized for a channel
3. has timed-out, i.e, has been disconnected from the cable for longer than a predetermined period of time
4. has been tampered with
5. tunes a parentally controlled channel
6. tunes a pay-per-view channel without a preview
8. tunes an IPPV channel with no free time
9. has a full IPPV event memory
10. is turned ON In accordance with the present invention, one method of providing barkers to subscribers is through the use of downloaded text barkers using the scroll channel output of scrambler 204e. The scroll channel is a dedicated data channel which only sends transactions that define downloaded text barkers. These downloaded text barkers are defined by the system control computer and downloaded to the subscriber terminal. Each text barker may include up to 16 pages, each page including 240 characters. Although barkers are a subset of messages utilizing a predetermined range of display numbers, they are preferably transmitted on the separate scroll channel so that other data streams, including message data, are not affected.

A barker transaction transmission is illustrated in FIG. 8. The transaction transmission includes an identification identifying it as a barker transaction transmission and information regarding each of the barker conditions specified above. For each condition, the transaction transmission includes a background color field for setting the background color on which the barker information is presented. The information may be presented on one of a number of different solid colors such as low intensity blue, high intensity blue, black, green, blue, red, and magenta. Alternatively, the information may be overlaid onto the video information. The transaction transmission contains field identifying where the appropriate barker information may be found. The information may be found on a six megahertz video channel, the scroll channel, or in the read only memory 420 of microprocessor 410, as set forth in greater detail below. The transaction transmission also includes the display number for the barker screen or screens as discussed above.

The transaction also identifies the channel which is tuned after the scroll channel data is obtained. The final channel tuned may be the selected channel, the video backer, the scroll channel, or the OFF channel. As noted above, microprocessor 410 preferably instructs on-screen display control circuit 406 to present barkers on a solid background, the color of the background being determined in accordance with the instructions contained in the barker transaction. Accordingly, it does not matter what channel is tuned by the up/down converter. Accordingly, the up down converter may be set to any channel after the barker screen information is retrieved. This is a useful feature since it allows a system operator to instruct the subscriber terminal to tune to a data channel while the subscriber is viewing a barker. The subscriber terminal then has an opportunity to receive any data addressed to it. This is particularly beneficial if, for example, a pay-per-view type barker is being viewed. Thus, it may be that the subscriber is awaiting authorization for some event. Thus the transaction may instruct microprocessor 410 to control data and control circuit 402 to set up/downconverter 401 to the data channel having fast-poll pay-per-view authorization data. This allows a subscriber to quickly obtain authorization information. By instructing the subscriber terminal to tune a particular data channel upon the viewing of a particular barker, the system operator can connect the subscriber terminal to a data channel most likely to quickly provide data such as authorizations. Thus, the barker transaction includes two tuning instructions. The first instructs the subscriber terminal to tune to where the barker information may be found. The second instructs the subscriber terminal to tune to where other information may be found.

Thus, in accordance with the present invention, downloaded text barkers are forwarded from the headend. Since the barker information characters are sent via a data transaction, a video barker channel is not necessary and the cable operator can utilize the valuable channel capacity. Although long response times could arise if the transactions containing the barker channel characters were interleaved with other transactions in the system, this may be overcome by the utilization of a separate scroll channel for the barkers. This channel includes only the barker transactions and no others.

Also in accordance with the present invention, barker information may be provided using a six megahertz video channel.

Finally, barker information may be generated from screens stored in ROM. As noted above, a number of conditions exist for which a barker screen is desirable. A number of these conditions are routine. Accordingly, in accordance with the present invention, information for generating a number of barker screens is stored in read only memory of microprocessor 410. When a subscriber selects a channel requiring one of these ROM barkers, the barker transaction instructs microprocessor 410 that the screen characters are in ROM and provides the appropriate display number. Microprocessor 410 uses the display number to retrieve the appropriate character codes and other display information which is then provided to on-screen display control 406. As noted above, if downloaded text barkers are utilized, the barker transaction instructs microprocessor 410 that the screen characters are on a data channel and provides the appropriate display number. Microprocessor 410 tunes the subscriber terminal accordingly and uses the display number to retrieve the barker data. However, with ROM barkers, there is no delay while waiting for data. Further, as with the downloaded text barkers, there is no need of a six megahertz video barker channel and thus channel capacity for other programming is increased. Various ROM barkers may be implemented.

An OFF barker such as illustrated in FIG. 9A may be presented when the subscriber terminal is OFF. Since the subscriber terminal is OFF, the OFF barker is simply a blank screen. As discussed in greater detail in the above-identified U.S. Pat. No. 5,058,160, when a subscriber terminal is switched OFF, an OFF channel is tuned for the purpose of receiving in-band data.

An INVALID CHANNEL barker such as illustrated in FIG. 9B may be presented when a subscriber selects a channel which does not appear in the cable system. Thus, a subscriber is informed that a particular channel is not available.

A NOT AUTHORIZED barker such as illustrated in FIG. 9C may be presented when a subscriber selects a channel having a premium service which the subscriber has not ordered. Thus, a subscriber is informed that he or she has not ordered a particular channel. It is noted that this barker uses the channel identification information HBO which is described in greater detail in the above-referenced commonly assigned application.

A TIME-OUT barker such as illustrated in FIG. 9D may be presented if the subscriber terminal does not periodically receive a refresh signal transmitted from the headend. The refresh period is globally controlled by the headend. Thus, a subscriber is informed that he or she should check the connection of the input cable to the terminal in order to ensure proper operation.

A TURN-ON barker such as illustrated in FIG. 9E may be presented every time a subscriber terminal is switched ON. The barker is cleared when the subscriber changes the channel.

A PARENTAL CONTROL barker such as shown in FIG. 9F may be presented when a subscriber selects a channel which is under parental control. This barker is cleared when parental control of the channel is released such as by entry of an appropriate parental code number. Thus, a subscriber is informed that a particular channel is under parental control. It is noted that this barker uses the channel identification information HAPY which is described in greater detail the above-referenced commonly assigned application.

A TAMPER barker such as illustrated in FIG. 9G may be presented when the microprocessor of the subscriber terminal detects tampering. As can be seen, this barker is blank.

The PPV barker such as illustrated in FIG. 9H may be presented when a subscriber selects a channel showing a pay-per-view event and no preview time remains or has been provided. If the user calls and buys the event, the headend will authorize the subscriber terminal and the event may be viewed. This barker may also be presented when an IPPV channel is selected and an event is not purchasable, i.e., it is outside the purchase window. Thus, a subscriber is informed that a particular channel may not be viewed since it contains pay-per-view or impulse pay-per-view events. It is noted that this barker uses the channel identification information PPV1 which is described in greater detail in the above-referenced commonly assigned application.

The IPPV—NO PURCHASE barker such as illustrated in FIG. 9I may be presented when a subscriber attempts to purchase an IPPV event and he or she is not permitted to make any additional purchases. This situation may arise, for example, when a subscriber has not paid for recent IPPV purchases or recent IPPV purchases have not been reported back to the billing computer. Thus, a subscriber is informed that he or she is unable to purchase any additional IPPV events.

The IPPV HELP barker such as illustrated in FIG. 9J may be presented when the subscriber selects a channel showing an IPPV event when the purchase window is still active. Thus, a subscriber is informed that he or she can purchase the event being shown on the selected channel. It is noted that this barker uses the channel identification information HTCH which is described in greater detail in the above-referenced commonly assigned application.

It will be apparent that the above-identified ROM barkers are merely representative of a currently preferred embodiment and the present invention is not limited in this respect.

It is to be understood that the invention is not limited to the illustrations described and shown herein which are deemed to be merely illustrative. The invention rather is intended to encompass all such modifications which are within its spirit and scope as defined by the appended claims.

We claim:

1. A subscriber terminal apparatus for use in an in-band television system in which in-band data is transmitted within one or more channels, said subscriber terminal apparatus comprising:
   an apparatus input terminal for receiving a television signal comprising a plurality of channels including said one or more channels containing said in-band data;
   an apparatus output terminal adapted to be connected to a television;

a tuner, coupled to said apparatus input terminal, for selectively tuning to one of said plurality of channels including said one or more channels containing said in-band data;

a processing circuit coupled to said tuner and including first in-band data extracting means for extracting an in-band message definition including tuning data from a first channel containing said in-band data to which said tuner is tuned, said tuning data indicating a second channel to which said tuner should be tuned;

second in-band data extracting means, responsive to said tuning data, for tuning said tuner to said second channel and extracting an in-band message transaction including message characters for display on said television; and outputting means for outputting the message characters; and a display control circuit including a first input terminal for receiving the message characters, generating means responsive to the message characters for generating a message display corresponding to the message characters, and an output terminal coupled to said apparatus output terminal for outputting the generated message display on said television.

2. The subscriber terminal apparatus as in claim 1, wherein said in-band message definition includes display attribute data for setting display attributes of said message display on said television.

3. The subscriber terminal apparatus as in claim 2, wherein said generating means generates said message display on a background color and said display attribute data includes color data for setting the background color.

4. The subscriber terminal apparatus as in claim 1, further comprising:

alerting means responsive to said first in-band data extracting means for alerting a viewer of said television when said in-band message definition has been extracted.

5. The subscriber terminal apparatus as in claim 4, wherein said altering means comprises an LED indicator.

6. The subscriber terminal apparatus as in claim 4, wherein said in-band message definition includes message alert data and said processing circuit is responsive to said message alert data for supplying message alert character data to said display control circuit to thereby generate a message alert display for display on said television.

7. The subscriber terminal apparatus as in claim 6, wherein said display control circuit includes a second input terminal for receiving a channel of said television signal tubed by said tuner and said generating means generates a message alert which is overlaid on a video portion of said channel tuned by said tuner.

8. The subscriber terminal apparatus as in claim 6, wherein said processing circuit further includes a memory for storing said message alert character data and wherein said processing circuit is responsive to said message alert data for retrieving said message alert character data from said memory and supplying said message alert character data to said first input terminal of said display control circuit to generate said message alert display for display on said television.

9. A method of displaying barker screens providing channel status information on a television in an in-band television system in which in-band data is transmitted within one or more channels from a headend controller to a subscriber terminal coupled to the television, the method comprising the steps of:

defining a plurality of said barker screens;

storing display information corresponding to one of said plurality of barker screens in a memory of said subscriber terminal;

transmitting, from said headend controller to said subscriber terminal, a barker transaction including a barker location field indicating where a corresponding barker screen is located;

receiving said barker transaction at said subscriber terminal;

extracting said barker location field from said barker transaction;

tuning a tuner of said subscriber terminal, in response to said barker location field containing a first location, to a channel having a video portion comprising a first barker screen corresponding to the first location;

retrieving from said memory, in response to said barker location field containing a second location, said stored display information and generating a second baker screen therefrom;

tuning said tuner of said subscriber terminal, in response to said barker location field containing a third location, to a channel having said in-band data including data for generating a third barker screen corresponding to the third location; and displaying one of said first, second or third barker screens on said television.

10. The method as in claim 9, wherein the step of transmitting said barker transaction comprises repeatedly transmitting said barker transaction in a loop from said headend controller.

11. A subscriber terminal apparatus for use in an in-band television system in which in-band data is transmitted within one or more channels, said subscriber terminal apparatus comprising:

an apparatus input terminal for receiving a television signal comprising a plurality of channels including said one or more channels containing said in-band data;

an apparatus output terminal adapted to be connected to a television;

a tuner, coupled to said apparatus input terminal, for selectively tuning to one of said plurality of channels including said one or more channels containing said in-band data;

barker definition extraction means, coupled to said tuner, for extracting a barker definition from one of said channels containing said in-band data, said barker definition comprising a barker location field indicating where a corresponding barker screen is located;

a memory for storing a plurality of said barker screens, said barker screens providing channel status information to a television viewer;

an on-screen display control circuit, coupled to said apparatus output terminal, for controlling display of said barker screens on said television; and processing means, responsive to said barker location field, for retrieving one of said barker screens and directing said on-screen display control circuit to display said retrieved barker screen.

12. The apparatus as in claim 11, wherein said memory is read-only and wherein said barker screens are pre-stored into said memory.

13. The apparatus as in claim 11, wherein at least some of said barker screens have been previously downloaded into said memory over said one of said channels containing said in-band data.

14. The apparatus as in claim 12, wherein said barker definition comprises display attributes for specifying the appearance of said barker screens on said television.

15. A subscriber terminal apparatus comprising:
a receiver for tuning to and receiving a plurality of channels, at least some of said channels containing in-band data;
first data extraction means for extracting, from a first channel to which said receiver is tuned, a message definition addressed to said subscriber terminal apparatus, said message definition comprising a message alert and tuning information indicating a second channel in which a message transaction containing characters for generating a screen display is located;
second data extraction means, responsive to said tuning information, for tuning said receiver to said second channel and extracting said message transaction corresponding to said message definition;
a memory for storing said message definition;
a message indicator; and
processing means, responsive to said message alert, for directing said message indicator to indicate to a user of said subscriber terminal apparatus that said message definition has been extracted.

16. The apparatus as in claim 15, wherein said message indicator comprises a light visible to said user.

17. The apparatus as in claim 16, further comprising message reading means, coupled to said processing means, for allowing said user to read said screen display, and message reading detection means, coupled to said processing means, for detecting when said user has read a last message and directing said processing means to extinguish said light upon said detection.

18. A subscriber terminal apparatus for use in an in-band television system in which in-band information is transmitted within one or more channels of a television signal, said subscriber terminal apparatus comprising:
a tunable receiver for tuning to and receiving said one or more channels of said television signal;
first data extraction means, coupled to said tunable receiver, for extracting a message definition from a first currently tuned channel of said television signal, said message definition comprising tuning information indicating the location of a corresponding message transaction, and display attributes indicating an appearance of a corresponding display, said message transaction comprising characters for display on a television;
a memory, coupled to said first data extraction means, for storing said extracted message definition;
a message alerting means, responsive to said first data extraction means, for alerting a subscriber that said extracted message definition has been extracted;
tuning means, responsive to a subscriber-supplied signal, for tuning said tunable receiver to a second channel of said television signal corresponding to said tuning information contained in said extracted message definition;
second data extraction means, coupled to said tunable receiver and responsive to said tuning information, for extracting said message transaction from said second channel;
an on-screen display control circuit for displaying said characters; and
processing means, responsive to said display attributes, for directing said on-screen display control circuit to display said characters.

19. The apparatus as in claim 18, wherein said message definition is individually addressed to said subscriber terminal.

20. The apparatus as in claim 18, wherein said message definition is globally addressed to a plurality of said subscriber terminals.

* * * * *